3,019,113
FRUIT SAUCES
William Abner Rooker, Berryville, Va.
(112 E. Piccadilly St., Winchester, Va.)
No Drawing. Filed Dec. 1, 1959, Ser. No. 856,336
3 Claims. (Cl. 99—186)

This invention relates to an improved process for preparing fruit sauces and the improved products obtained thereby. In particular, it relates to an improved process for making apple sauce, and to an apple sauce having an improved flavor and texture.

The method generally employed in preparing canned apple sauce comprises peeling, coring and trimming the apples and then conveying the prepared fruit in relatively large pieces to a standard cooker where it is mixed with the requisite quantity of sugar and cooked to the desired degree. The volume of the uncooked apples is to great that for economical operation the cooking must be accomplished in a very short time. In present practice the cooking period seldom exceeds three minutes. To achieve thorough cooking in such a short period the apples are cooked under pressure at temperatures of about 216° to 226° F. The requisite cooking temperatures and pressures are generally obtained by the injection of steam into a closed cooking chamber. A disadvanage in such a cooking procedure stems from the fact that to obtain a desirable sauce it is advisable to combine several varieties of apples. For example, some varieties cook into a sauce of good color and consistency but poor flavor, while others provide excellent flavor and aroma but poor consistency or color. Hitherto, all of the varieties have been combined in the desired proportions and cooked together with the result that either the soft varieties are overcooked, producing a pasty, off-colored sauce, or the hard varieties are undercooked.

After cooking is completed, the cooked mass is conveyed into a standard finishing machine where the coarse fibers and peel particles are removed. At this point any hard, under-cooked apple fragments present are removed with the waste. When the cooked mass leaves the cooker and enters the finisher there is a sudden drop from the superatmospheric pressures maintained in the cooker to the normal pressure prevailing in the finisher, with an accompanying flash-off of vapor and drop in temperature. At the same time a large proportion of the aromatic flavoring constituents in the apple volatilizes with resulting impairment of the flavor and aroma of the apple sauce product.

The object of this invention is to provide an improved process for preparing fruit sauces whereby loss of the aromatic constituents of the fruit is substantially eliminated with consequent improvement in aroma and flavor of the finished product.

Another object is to provide an improved process for peparing fruit sauces wherein several varieties having different cooking properties may be combined into a single product without undercooking or over-cooking of individual fruit components, thereby improving the color and texture of the product and eliminating waste.

Still another object is to provide fruit sauce products and specifically apple sauce, which are improved with respect to flavor, texture and aroma.

Other objects and advantages will become apparent from the following description.

My Patent No. 2,582,396, "Process for Preparing Fruit Sauce Products," covers a process which imparts fresh-fruit flavor and aroma to fruit sauce by adding comminuted raw fruit to hot cooked sterile sauce. In the usual processes of manufacture of fruit sauces the aromatic constituents of the fruit are lost by vapor flash-off, but as explained in the above patent some fruit flavor and aroma can be imparted to such a sauce by adding comminuted raw fruit to the cooked sauce. However, the amount of raw fruit which may be added in the manner described is limited and is usually only 20 percent or less by weight of the finished product which therefore consists of not more than 20 percent of raw fruit and not less than 80 percent of cooked sauce. The finished sauce generally contains little more than 20 percent of the aromatic flavoring substances present in all of the fruit used because the aromatics are lost from the cooked portion in the usual cooking process. Yet even so little as 10 percent of added raw fruit appreciably improves the flavor and aroma of the sauce.

Commercial apple sauce is usually prepared from a mixture of several varieties of apples. The mixed fruit is cooked under steam pressure in continuous cookers. The purpose of cooking is to soften the fruit so that it will pass through a finishing machine. Raw fruit can not be finished and most of the undercooked fruit will be discharged from the finisher along with the waste or refuse. So, for efficient and economical finishing, all of the fruit must be properly softened in the cooker. However, if the fruit is overcooked the finished sauce will not have the desired grainy texture. No two varieties of fruit cook exactly alike and the cooking required to properly soften the hard varieties will invariably overcook the soft varieties. Therefore, the amount of the desired graininess in the finished sauce is in direct ratio to the percentage of hard varieties in the fruit mix. The hard varieties seldom exceed 30 percent of the mix and the desired graininess in the sauce is limited accordingly.

It would appear that, insofar as flavor and aroma are concerned, the ideal process of manufacture of fruit sauces would be one by which all of the aromatics of the total fruit used would be retained in the finished product. The present invention provides such a process for it avoids the usual vapor flash-off of the aromatic constituents of the fruit.

Briefly in the process comprising my invention, the fruit is prepared by peeling, coring, trimming; and, after further comminution to a particle size which imparts the desired graininess to the sauce, the prepared fruit is heated in a closed unit to a degree substantially below its normal boiling or aromatic flash-off point at atmospheric pressure, whereby the loss of aromatic and volatile constituents is substantially diminished and may in some instances be entirely eliminated. The warmed fruit is then blended with a heated sweetening material such as a concentrated sugar solution in water, the relative proportions and temperatures being selected so that the resulting mixture is preferably at a temperature sufficient to sterilize the fruit and the sweetened hot fruit sauce is then filled into containers which are promptly sealed and quickly cooled. It will be noted that in the process outlined above a fruit sauce having the desired texture (graininess) is produced without the use of a finishing machine, commonly employed in prior art processes for this purpose.

The following examples will serve to further illustrate the practice of my invention:

*Example 1*

(1) A blend of fruit is made by mixing several varieties of apples. In that no cooking problems are involved to retain graininess, varieties may be mixed regardless of their respective maturities or degrees of hardness.

(2) The apples are peeled, cored, and trimmed.

(3) The prepared fruit is passed thru a comminutor with its blades and screen of proper sizes to give the desired particle or grain size in the finished sauce. The grain size may be varied from 5 to 30 mesh according to the trade or the manufacturer's preference.

(4) To minimize undesirable color changes and flavor losses due to oxidation. Vitamin C (ascorbic acid) may be added to the fruit as it enters or leaves the comminutor. The amount of Vitamin C required for flavor and color protection is 30 to 70 milligrams per 1,000 grams of finished sauce. Or sufficient Vitamin C may be added to give the sauce the standard dietetic value or the daily minimum adult requirement of 30 milligrams per 4 ounce serving of sauce.

(5) The comminuted fruit is then passed thru a continuous heater and is warmed to a temperature above the minimum sterilization temperature of the fruit but below the normal boiling point of the fruit at atmospheric pressure. For fruit sauce with a pH of 4 this temperature is about 165° F. In actual practice the comminuted fruit is warmed to 180°–185° F. At such temperatures the fruit is heated sufficiently to soften it and to eliminate its raw flavor but not enough to destroy the desired graininess. A satisfactory heater consists of a continuous worm within a double jacket, with steam or hot water or other heating fluid circulated thru the jacket. Or the worm may be inclosed in a single-wall jacket, in which case live steam is injected into the fruit as it passes thru the heating unit.

(6) The warmed comminuted fruit is conveyed to a mixing or blending tank and is mixed with the desired amount of sugar syrup or dry sugar and water. I prefer to use a 40 to 60 percent sugar solution which is heated to its boiling point immediately before it is added to the warmed fruit. The amount of the sugar solution required is seldom less than 20 percent of the weight of the finished sauce. If the temperature of the comminuted fruit is about 180° F. and the temperature of the sugar solution is about 214° F., the temperature of the resulting mixture to be filled into the containers will be about 187° F. which is sufficiently high to prevent subsequent spoilage, since as I have found, a fruit sauce having a pH of 4.0 or lower will remain sterile if filled and sealed in containers at a temperature as low as 180° F.

(7) The mixture of fruit and sugar is filled into the containers which are sealed immediately. As the containers are being sealed the head-space may be evacuated to minimize air or oxygen in the head-space after the containers are cooled.

(8) The sealed containers are then inverted or turned upside down for 1 to 4 minutes to sterilize the lids. The hot contents serve as the sterilizing medium.

(9) The sauce is then cooled quickly in water, or by other suitable means.

(10) The containers are then labeled and cased for storage or shipment.

A further modification of my invention is as follows:

*Example II*

The fruit is prepared as in steps 1–4 of Example I and then the comminuted fruit is warmed in the continuous heater to a temperature sufficiently high to insure a vacuum of at least 13 inches in the containers after they are cooled to room temperature. A filling temperature of 165° F. is sufficient to give the desired vacuum. If 20 percent of sugar solution is added at 214° F. and the comminuted fruit has been heated to between about 155° and 160° F. prior to mixing it with the hot sugar solution, the desired 165° F. filling temperature is readily obtained. The mixed fruit and sugar is then filled and sealed in containers as described in step 7 of Example I.

The filling temperature of 165° F. is not high enough to prevent subsequent spoilage so the sauce must be sterilized in the containers. This is accomplished by immersing the containers in hot water for a sufficient time to sterilize the contents. The holding time will vary with the size of the containers and with the temperature of the water. For example, a 25 minute holding time is ample for 17 ounce cans and 15 ounce glass jars when the water temperature is 204° to 208° F.

After sterilization, the cans or jars are cooled, labeled, and cased as described in steps 9 and 10 of Example I.

The following table illustrates the improved quality of an apple sauce prepared by my invention. The table compares two lots of sauce prepared from the same varieties at the same time, one sauce prepared by the process described in Patent No. 2,582,396 and the other prepared by the process described herein.

|  | Patent No. 2,582,396 | Present Process |
| --- | --- | --- |
| Color | 19 | 19 |
| Flavor | 20 | 27 |
| Finish (graininess) | 19.5 | 25 |
| Consistency | 19 | 20 |
| Defects | 17.5 | 17 |
| Comparative Scores | 95 | 108 |

As indicated above, there is a marked improvement in both flavor and texture (graininess) of the sauce produced by the present invention.

To be graded as "Fancy," the apple sauce must have a total score of not less than 85 and individual scores of not less than 17 as to color, consistency and flavor. Sauces having total scores of less than 85 on the five rated factors, or less than 17 on the three above-mentioned specific factors, are rated and sold as "Standard" grade. Since apple sauces prepared according to my process improve consistency and flavor and increase the total score by an average of fifteen points as compared with the improved sauces produced by the process of my earlier patent, it not only raises low "Fancy" grades to high "Fancy" grades, but it brings many "Standard" lots into the "Fancy" grade.

While I do not wish to be bound by any specific explanation as to why the product of the present invention has such a markedly superior graininess, it will be noted that the process described does not include actual cooking of the fruit. Consequently there is no over-cooked fruit and none of the fruit becomes pasty or grain-free. Thus all of the fruit is available to impart graininess to the sauce. The graininess of various sauces was compared by determining the percentages of each sauce retained on a 20 mesh screen when the sauce was washed for 4 minutes with a controlled stream of cold water. Seventeen lots of sauce prepared by other presently employed processes contained from 19.3 percent to 34.4 percent of 20 mesh or larger particles with an average of 28.2 percent. Eleven lots of sauce prepared with the process of the present invention contained from 62.4 percent to 64.2 percent of 20 mesh or larger particles with an average of 63.7 percent, which clearly indicated the increased graininess of the new sauce.

Furthermore it is much easier to obtain the desired grain size by means of the present invention than was the case when using a conventional finisher. In the present process the desired grain size is obtained by changing the blades and screens in the comminutor. In previously known processes the usual procedure is to increase or decrease the size of the openings in the finisher screens. This can be done only by changing the screens in the finishers. Such changes have a very limited range because, (1) decreasing the size of the openings increases the amount of waste from the finisher and, (2) increasing the size of the openings increases the undesirable coarse fibers, seed sections, and peel particles in the finished sauce.

The process described herein permits a more accurate and more economical control over the added sugar and water, resulting in part from the elimination of a finisher, with the inherently variable amount of finishing waste incident to prior art processes.

By eliminating the pressure cooker, the steam consumption in the process is decreased and by replacing the finisher with the comminutors, operating on uncooked fruit, it has been found that much less care is required in selecting and blending fruits without such stringent requirements as to respective maturities or degrees of hardness.

Although my new process has been particularly described with respect to the preparation of apple sauce, it is equally suitable for the preparation of sauces from other fruits, as for example, for consumption by young children. In general, any fruit which is suitable for the preparation of a sauce may be processed according to my method so long as it has a pH of less than 4 to ensure sterilization of the uncooked pulp. Examples of other fruits which can be made into sauces by my process, include apricots, peaches, pears, pineapples, plums, quince and the like. The cooking temperatures will, of course, vary with the individual fruit and care must be taken to warm the temperature of the batch to the requisite sterilization temperature for the particular fruit. In practice, it may be advisable not to fill the containers when the temperature of the sauce is at the minimum sterilization temperature, but rather slightly above this to make certain that cooling below the effective temperature does not occur during the short interval requisite for complete sterilization. The sauce should be immediately poured into containers and sealed. The containers are cooled, labeled and packed in the usual manner.

My process is also applicable to mixtures of different kinds of fruit, as for example, sauces comprising blends of apples and apricots, pears and apples, and the like, or to mixtures of a single fruit, e.g. mixtures of several varieties of apples.

Although this invention has been described with reference to illustrative embodiments thereof, it will be apparent to those skilled in the art that the principles of this invention may be embodied in other forms, but within the scope of the appended claims.

I claim:
1. A process for preparing fruit sauce having an enhanced graininess and flavor from fruits having a pH of less than 4, which comprises: comminuting the raw fruit into a raw pulp to produce a selected grain size in the finished sauce, heating the raw pulp to a temperature above its sterilization temperature but below the normal boiling point of the fruit at atmospheric pressure to eliminate the raw flavor and soften the fruit and not enough to destroy the desired graininess, and thereafter filling the sterile mixture into containers and effecting sterilization of the fruit sauce.

2. The process of claim 1, wherein the pulp is heated to a temperature above 180° F.

3. A process for preparing fruit sauce having an enhanced graininess and flavor from fruits having a pH of less than 4, which comprises: comminuting and screening the raw fruit into a raw pulp to a mesh size between about 5 to 30 mesh to provide the desired grain size in the finished sauce, heating the raw pulp to a temperature between about 180° F. to 185° F. to sterilize the sauce, eliminate the raw flavor and soften the fruit without destroying the desired graininess, and filling the mixture into containers to effect sterilization of the contents and containers.

References Cited in the file of this patent
UNITED STATES PATENTS 2,582,396     Rooker ---------------- Jan. 15, 1952

OTHER REFERENCES

"Modern Encyclopedia of Cooking," vol. I, 1949, by Meta Given, published by J. G. Ferguson & Associates, Chicago, p. 786, article entitled Applesauce.

"The Good Housekeeping Cookbook," 1949, by D. B. March, published by Rinehart & Company, Inc., New York, p. 59, article entitled Applesauce.